(12) United States Patent
North et al.

(10) Patent No.: US 11,505,331 B2
(45) Date of Patent: Nov. 22, 2022

(54) METHOD AND SYSTEM FOR ENABLING COMPONENT MONITORING REDUNDANCY IN A DIGITAL NETWORK OF INTELLIGENT SENSING DEVICES

(71) Applicant: GE Aviation Systems Limited, Cheltenham (GB)

(72) Inventors: Timothy Robert North, Southampton (GB); Tod Alexander Gilbert, Hampshire (GB); Steven Bonnett, Hampshire (GB)

(73) Assignee: GE Aviation Systems Limited, Cheltenham (GB)

(*) Notice: Subject to any disclaimer, the term of this patent is extended or adjusted under 35 U.S.C. 154(b) by 138 days.

(21) Appl. No.: 15/996,637

(22) Filed: Jun. 4, 2018

(65) Prior Publication Data

US 2018/0354647 A1    Dec. 13, 2018

(51) Int. Cl.
*B64D 45/00* (2006.01)
*B64F 5/60* (2017.01)
(Continued)

(52) U.S. Cl.
CPC .............. *B64D 45/00* (2013.01); *B64F 5/60* (2017.01); *G07C 5/008* (2013.01); *G07C 5/0808* (2013.01); *G07C 5/0816* (2013.01); *B64D 2045/0085* (2013.01); *F16H 57/01* (2013.01); *F16H 2057/012* (2013.01); *H04L 2012/4028* (2013.01)

(58) Field of Classification Search
CPC ............ B64D 45/00; B64D 2045/0085; G07C 5/0816; G07C 5/0808; G07C 5/008; B64F 5/60; H04L 2012/4028; F16H 2057/012; G05B 23/0297
See application file for complete search history.

(56) References Cited

U.S. PATENT DOCUMENTS 4,654,846 A * 3/1987 Goodwin ............. G05D 1/0077
700/82
5,819,188 A 10/1998 Vos
(Continued)

FOREIGN PATENT DOCUMENTS

| WO | 2015171740 A1 | 11/2015 |
| WO | 2016034825 A1 | 3/2016 |
| WO | 2016191243 A1 | 12/2016 |

OTHER PUBLICATIONS

Combined Search and Examination Report issued in connection with corresponding GB Application No. GB1709065.5 dated Oct. 12, 2017.
(Continued)

*Primary Examiner* — Aniss Chad
*Assistant Examiner* — Chase L Cooley
(74) *Attorney, Agent, or Firm* — Amin, Turocy & Watson, LLP

(57) ABSTRACT

Techniques for employing a smart sensor device (102) that has a primary sensing function for sensing a state of a physical component and can concurrently enable one or more backup functions for sensing one or more states of one or more other physicals components in response to one or more other smart sensor devices (102 and/or 116) not being able to perform their primary function of sensing and/or reporting on the one or more states of the one or more other physical components.

20 Claims, 10 Drawing Sheets

(51) Int. Cl.
*G07C 5/00* (2006.01)
*G07C 5/08* (2006.01)
*F16H 57/01* (2012.01)
*H04L 12/40* (2006.01)

(56) References Cited

U.S. PATENT DOCUMENTS

| | | |
|---|---|---|
| 6,389,335 B1 | 5/2002 | Vos |
| 7,117,390 B1 | 10/2006 | Klarer et al. |
| 7,636,038 B1 | 12/2009 | Nof et al. |
| 8,144,005 B2 | 3/2012 | Hu et al. |
| 8,260,492 B2 | 9/2012 | Stange et al. |
| 8,527,240 B2 | 9/2013 | Scheid et al. |
| 8,577,521 B2 | 11/2013 | Genissel |
| 8,612,639 B1 | 12/2013 | Righi et al. |
| 8,763,950 B2 | 7/2014 | Shue et al. |
| 9,233,763 B1 | 1/2016 | Chen |
| 9,395,219 B1 | 7/2016 | Dow et al. |
| 9,552,262 B2 | 1/2017 | Amanuddin et al. |
| 9,573,682 B2 | 2/2017 | Heusinger et al. |
| 9,605,996 B2 | 3/2017 | Kessler et al. |
| 2003/0158694 A1 | 8/2003 | Wegerich |
| 2004/0267395 A1* | 12/2004 | Discenzo ............ G05B 13/024 700/99 |
| 2013/0191681 A1 | 7/2013 | Moiseev et al. |
| 2013/0211737 A1 | 8/2013 | Batcheller et al. |
| 2014/0090456 A1 | 4/2014 | Meisner et al. |
| 2016/0001894 A1 | 1/2016 | Jones et al. |
| 2016/0076931 A1 | 3/2016 | Bonnett et al. |
| 2016/0236794 A1* | 8/2016 | Tucker .................. B64D 43/02 |
| 2016/0371957 A1* | 12/2016 | Ghaffari ................. G01M 5/00 |
| 2017/0091007 A1 | 3/2017 | Dasari |
| 2017/0247112 A1* | 8/2017 | Horner .................. B64D 13/04 |

OTHER PUBLICATIONS

Matsushiba et al., Structural health monitoring system considering fault-tolerance, IEEE International Conference on Industrial Informatics (INDIN), p. 330-335, 2008, Proceedings—IEEE INDIN 2008: 6th IEEE International Conference on Industrial Informatics.

Examination Report received for GB Patent Application Serial No. 1709065.5 dated Jun. 26, 2019, 7 pages.

First Office Action received for Canadian Patent Application Serial No. 3,006,095 dated Mar. 15, 2019, 4 pages.

* cited by examiner

METHOD AND SYSTEM FOR ENABLING COMPONENT MONITORING REDUNDANCY IN A DIGITAL NETWORK OF INTELLIGENT SENSING DEVICES

FIELD OF INVENTION

The subject disclosure relates generally to employing a network of intelligent sensing devices, respectively having primary and back functions, to monitor physical components on an aircraft.

BACKGROUND OF THE INVENTION

Aircrafts have many physical components, many of them critical, which need to be monitored in flight and/or on the ground for fault conditions. For example, a single gearbox can have forty or more sensors monitoring gears and bearings in the gearbox. Conventionally, each of these sensors would be an analog sensor with a pair of wires leading to an input module of a controller/monitoring device. Given the hundreds or more sensors in an aircraft, the weight of the sensors and associated wiring can be significant, thus adding to the amount of fuel consumed in flight. In addition, the installation and maintenance costs associated with the analog wiring to the sensors can be significant.

Additionally, in order to increase safety, many of the physical components are monitored using dedicated redundant sensors for each physical component. For example, a critical physical component can have two or more sensors that are dedicated to monitoring the critical physical component. This redundancy of sensors and associated wiring further increases the aircraft weight, and associated costs of fuel, installation, and maintenance.

For example, as described in Chen, U.S. Pat. No. 9,233,763: "In addition, each of the various sub-systems can each include one or more sensors to facilitate measurement and generation of data pertaining to operation of that sub-system of the aircraft 100 (and/or a component of that sub-system), to assist in performing diagnostics and health monitoring of one or more sub-systems, etc. For critical sub-subsystems, it is common to have redundant sensors (e.g., triple redundant or quad-redundant) in the event of sensor failure. Each sensor can generate data that is used to provide information to the pilot during flight and to be used by aircraft maintenance personnel prior to or after flight", and "Redundant smart sensors 504-1-504-4 (e.g., quad-redundant as shown) each input a respective measured sensor signal 506-1-506-4 into a reference signal generator 508. Reference signal generator 508 discards (or ignores) the highest sensor value and the lowest sensor value and averages the remaining two sensor signals to provide the reference signal. This technique is used for quad-redundant (and higher redundancy) configurations. For triple-redundant sensors, the highest sensor value and the lowest sensor value are discarded (or ignored) and the remaining sensor signal becomes the reference value." However, the publication of Chen employs redundant sensors of the same type that are each respectively dedicated to monitoring the same component/subsystem.

The above-described deficiencies of aircraft sensor systems are merely intended to provide an overview of some of the problems of current technology, and are not intended to be exhaustive. Other problems with the state of the art, and corresponding benefits of some of the various non-limiting embodiments described herein, may become further apparent upon review of the following detailed description.

BRIEF DESCRIPTION OF THE INVENTION

The following presents a summary to provide a basic understanding of one or more examples of the invention. This summary is not intended to identify key or critical elements, or delineate any scope of the particular examples or any scope of the claims. Its sole purpose is to present concepts in a simplified form as a prelude to the more detailed description that is presented later. In one or more examples described herein, systems, computer-implemented methods, apparatus and/or computer program products that facilitate employing a smart sensor device (e.g., intelligent sensing device) that has a primary function (e.g. code, logic, program, configuration, algorithm, circuitry, etc.) for sensing a state of a physical component and can concurrently enable one or more backup functions for sensing one or more states of one or more other physical components in response to one or more other smart sensor devices not being able to perform their primary function of sensing and/or reporting on the one or more states of the one or more other physical components are described.

According to one aspect, a smart sensor device is provided. The smart sensor device can comprise a sensing element. The smart sensor device can also comprise a memory that stores computer executable components. The smart sensor device can further comprise a processor that executes the computer executable components stored in the memory. The computer executable components can comprise a monitoring component configured to: generate first sensed information associated with a first aircraft physical component based on execution of a primary sensing function and one or more signals from the sensing element; monitor communication from a second smart sensor device performing sensing associated with a second aircraft physical component; and in response to a first determination that the second smart sensor device is not operating properly based on the communication: execute a backup sensing function in conjunction with the primary sensing function, generate the first sensed information associated with the first aircraft physical component using the primary sensing function and one or more other signals from the sensing element, and generate second sensed information associated with the second aircraft physical component using the backup sensing function and the one or more additional signals from the sensing element.

According to another aspect, a method can comprise generating, by a first smart sensor device, first sensed information associated with a first aircraft physical component based on execution of a primary sensing function; monitoring, by the first smart sensor device, communication from a second smart sensor device performing sensing associated with a second aircraft physical component; and in response to determining, by the first smart sensor device, that the second smart sensor device is not operating properly based on the communication: executing a backup sensing function in conjunction with the primary sensing function, generating the first sensed information associated with the first aircraft physical component using the primary sensing function, and generating the second sensed information associated with the second aircraft physical component using the backup sensing function.

According to yet another aspect, a system is provided. The system can comprise a first smart sensor device communicatively coupled to a second smart sensor device; wherein the first smart sensor device comprises a first function for monitoring a first aircraft physical component and a second function for monitoring a second aircraft physical component, and the first smart sensor device monitors the first aircraft physical component using the first function; wherein the second smart sensor device comprises the second function for monitoring the second aircraft physical component, and the second smart sensor device monitors the second aircraft physical component using the second function; and wherein the first smart sensor device, in response to a first determination that the second smart sensor device is no longer monitoring the second aircraft physical component, monitors the first aircraft physical component using the first function and monitors the second aircraft physical component using the second function.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description may include additional or alternative aspects beyond those described in this summary.

DETAILED DESCRIPTION

Figure 1:
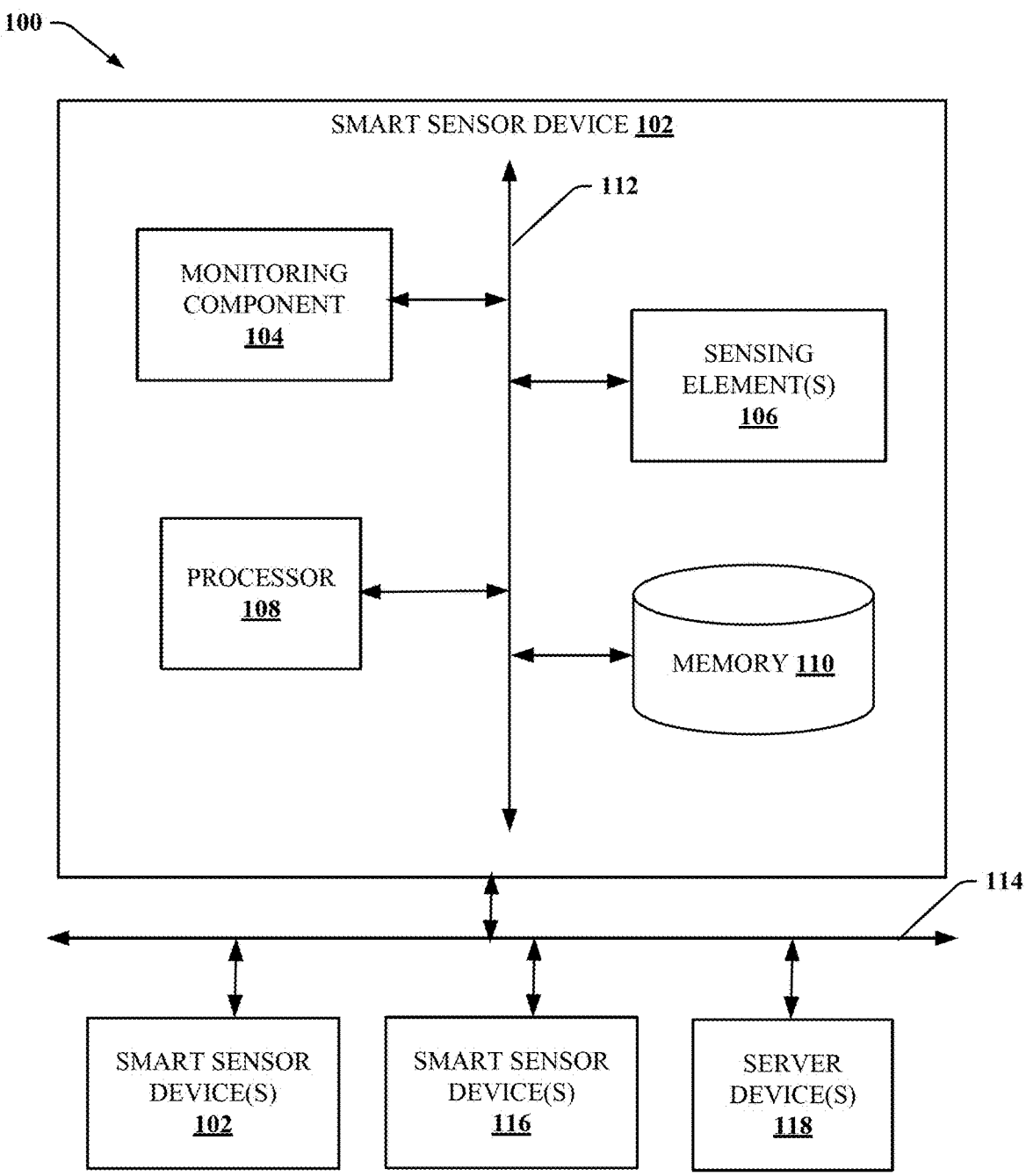
FIG. 1 illustrates a block diagram of an example, non-system that facilitates networked smart sensor devices monitoring physical components of an aircraft in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. In other instances, well-known structures and devices are shown in block diagram form in order to facilitate describing the subject disclosure.

In order to overcome one or more disadvantages as described in the background, one or more embodiments disclosed herein can employ a smart sensor device that has a primary function for sensing a state of a physical component and can concurrently enable one or more backup functions for sensing one or more states of one or more other physical components in response to one or more other smart sensor devices not being able to perform their primary function of sensing and/or reporting on the one or more states of the one or more other physical components.

For example, a first smart sensor device can have a primary function for sensing a state of a first physical component, and a second smart sensor device can have a primary function for sensing a state of a second physical component. The first smart sensor device can have a backup function for sensing a state of the second physical component, and the second smart sensor device can have a backup function for sensing a state of the first physical component. The first smart sensor device and the second smart sensor device can communicate with each other on a network. In a non-limiting example, first smart sensor device and the second smart sensor device can send respective status (e.g. heartbeat) messages to each indicating their respective health states, or they can send sensed information for their respective physical components to each other or to another device on the network. In response to either smart sensor device determining an indication of a fault condition with the other smart sensor device, the smart sensor device can enable their backup function along with their primary function. For example, if first smart sensor device receives an indication from second smart sensor device that the second smart sensor device is not operating properly or if first smart sensor device determines that the second smart sensor device is no longer communicating (e.g. not transmitting for a threshold amount of time), first smart sensor device can add its backup function for processing along with its primary function. In this manner, first smart sensor device can sense states of the first physical component and the second physical component. In the above example, the pair of smart sensor devices act as backup for each other while also performing their primary sensing functions. In other embodiments, three or more smart sensor devices can as backups for each other while also performing their primary sensing functions.

The computer processing systems, computer-implemented methods, apparatus and/or computer program products employ hardware and/or software to solve problems that are highly technical in nature (e.g., related to smart sensor device that has a primary function for sensing a state of a physical component and can concurrently enable one or more backup functions for sensing one or more states of one or more other physical components in response to one or more other smart sensor devices not being able to perform their primary function of sensing and/or reporting on the one or more states of the one or more other physical components, etc.), that are not abstract and that cannot be performed as a set of mental acts by a human. One or more embodiments of the subject computer processing systems, methods, apparatuses and/or computer program products enable smart sensor devices to employ artificial intelligence to coordinate amongst themselves, and optionally with other devices, to perform actions to implement their primary sensing functions and enable their backup sensing functions in response to a fault condition of one or more the smart sensor devices.

The networked smart sensor devices having primary and backup sensing functions can allow for a reduction in the number of sensing devices and associated wiring in an aircraft, thus reducing the weight of the aircraft and reducing associated costs of fuel, installation, and maintenance.

While examples herein refer to aircraft for illustrative purposes, it is to be appreciated that the novel concepts disclosed herein can be employed for any type of vehicle or machine that has a significant amount of sensing devices, non-limiting examples of which can include a space vehicle, a satellite, a watercraft, a submarine, a drilling or boring machine, or any other suitable vehicle or machine.

In general, sensors (e.g. smart sensor devices) can be used to sense light, motion, temperature, magnetic fields, gravitational forces, humidity, vibration, pressure, electrical fields, current, voltage, sound, and other suitable physical aspects of an environment through one or more sensing elements. Non-limiting examples of sensors can include acoustic sensors, vibration sensors, air data sensors (e.g., air speed, altimeter, angle of attack sensor,), inertial sensors (e.g., gyroscope, accelerometer, inertial reference sensor), magnetic compass, navigation instrument sensor, electric current sensors, electric potential sensors, magnetic sensors, radio frequency sensors, fluid flow sensors, position, angle, displacement, distance, speed, (e.g., inclinometer, position sensor, rotary encoder, rotary/linear variable differential transducers, tachometer, etc.), optical, light, imaging sensors (e.g., charge-coupled device, infra-red sensor, LED, fiber optic sensors, photodiode, phototransistors, photoelectric sensor, etc.), pressure sensors and gauges, strain gauges, torque sensors, force sensors piezoelectric sensors, density sensors, level sensors, thermal, heat, temperature sensors (e.g., heat flux sensor, thermometer, resistance-based temperature detector, thermistor, thermocouple, etc.), proximity/presence sensors, or any other suitable type of sensor.

Physical components can comprise any hardware component of a vehicle or machine, non-limiting examples of which can include, gears, bearings, motors, pumps, valves, pipes, wires, flaps, tanks, wheels, blades, fans, joints, or any other suitable hardware component of a vehicle or machine.

It is to be appreciated that smart sensor devices as described in examples herein can be located within a suitable proximity to a physical component to perform a primary sensing function of the physical component, and can also be located within a suitable proximity to another physical component to perform a backup sensing function of the other physical component.

Aircraft can include any suitable type of aircraft, non-limiting examples of which include airplanes, helicopters, blimps, commercial aircraft, non-commercial aircraft, military aircraft, government aircraft, space aircraft, and/or any other suitable type of aircraft.

FIG. 1 illustrates a block diagram of an example, non-limiting system 100, that can be implemented in an aircraft, that facilitates automated employment of a smart sensor device that has a primary function for sensing a state of a physical component and can concurrently enable one or more backup functions for sensing one or more states of one or more other physical components in response to one or more other smart sensor devices not being able to perform their primary function of sensing and/or reporting on the one or more states of the one or more other physical components in accordance with one or more embodiments described herein. Repetitive description of like elements employed in other embodiments described herein is omitted for sake of brevity. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., one or more computers, one or more computing devices, one or more virtual machines, etc., can cause the one or more machines to perform the operations described.

As shown in FIG. 1, the system 100 can include one or more smart sensor devices 102, one or more smart sensor devices 116, one or more networks 114, and one or more server devices 118.

Smart sensor device 102 can include or otherwise be associated with at least one memory 1110 that can store computer executable components (e.g., computer executable components can include, but are not limited to, the monitoring component 104, and associated components). Smart sensor device 102 can also include or otherwise be associated with at least one processor 108 that executes the computer executable components stored in the memory 110. Smart sensor device 102 can also include one or more sensing elements 106 for sensing a physical aspect(s) of an environment around smart sensor device 102. Smart sensor device 102 can further include a system bus 112 that can couple the various components including, but not limited to, monitoring component 104, sensing element 106, processor 108, memory 110, and/or other components.

Smart sensor device 116 can be a sensor device similar to smart sensor device 102 with the ability to sense more, less, or different physical aspect(s) of an environment than smart sensor device 102. In a non-limiting example, smart sensor device 102 can sense vibration, while smart sensor device 116 senses acoustics. In another non-limiting example, smart sensor device 102 can sense vibration and acoustics, while smart sensor device 116 senses optical aspects of the environment. In a further non-limiting example, smart sensor device 102 can sense vibration and acoustics, while smart sensor device 116 senses vibration and temperature. It is to be appreciated that any combination of sensing capabilities can be implemented in smart sensor device 102 and/or smart sensor device 116. All such embodiments are envisaged. Smart sensor device 116 can also include monitoring component 104.

Server device 118 can be any computing device that can be communicatively coupled to smart sensor device 102 and/or smart sensor device 116, non-limiting example of which can include a server computer, a computer, a mobile computer, a control system, an air traffic control system, a collision avoidance system, a ground control system, a weather computer, an emergency system, a communication system, a warning system, a radar system, a traffic system, a data analysis system, a communication device, and/or any other suitable computing device. It is to be appreciated that smart sensor device 102, smart sensor device 116, and server device 118 can be equipped with communication hardware and/or software that enable communication amongst smart sensor device 102, smart sensor device 116, and server device 118.

The various components (e.g., monitoring component 104, processor 108, memory 110, smart sensor device 102, smart sensor device 116, server device(s) 118, and/or other components) of system 100 can be connected either directly or via one or more networks 114. Such networks 114 can include wired and wireless networks, including, but not limited to, a cellular network, a wide area network (WAN) (e.g., the Internet), and/or a local area network (LAN). Wireless networks can include any suitable wireless communication medium, non-limiting examples of which include, electromagnetic (EM), cellular, WAN, wireless fidelity (Wi-Fi), Wi-Max, WLAN, Li-Fi, radio communication, microwave communication, satellite communication, optical communication, sonic communication, electromagnetic induction communication, and/or any other suitable wireless communication technology. It is to be appreciated that in establishing a data connection and or communication channel, any suitable communication protocol and/or authentication mechanism can be employed in embodiments disclosed herein.

Figure 2:
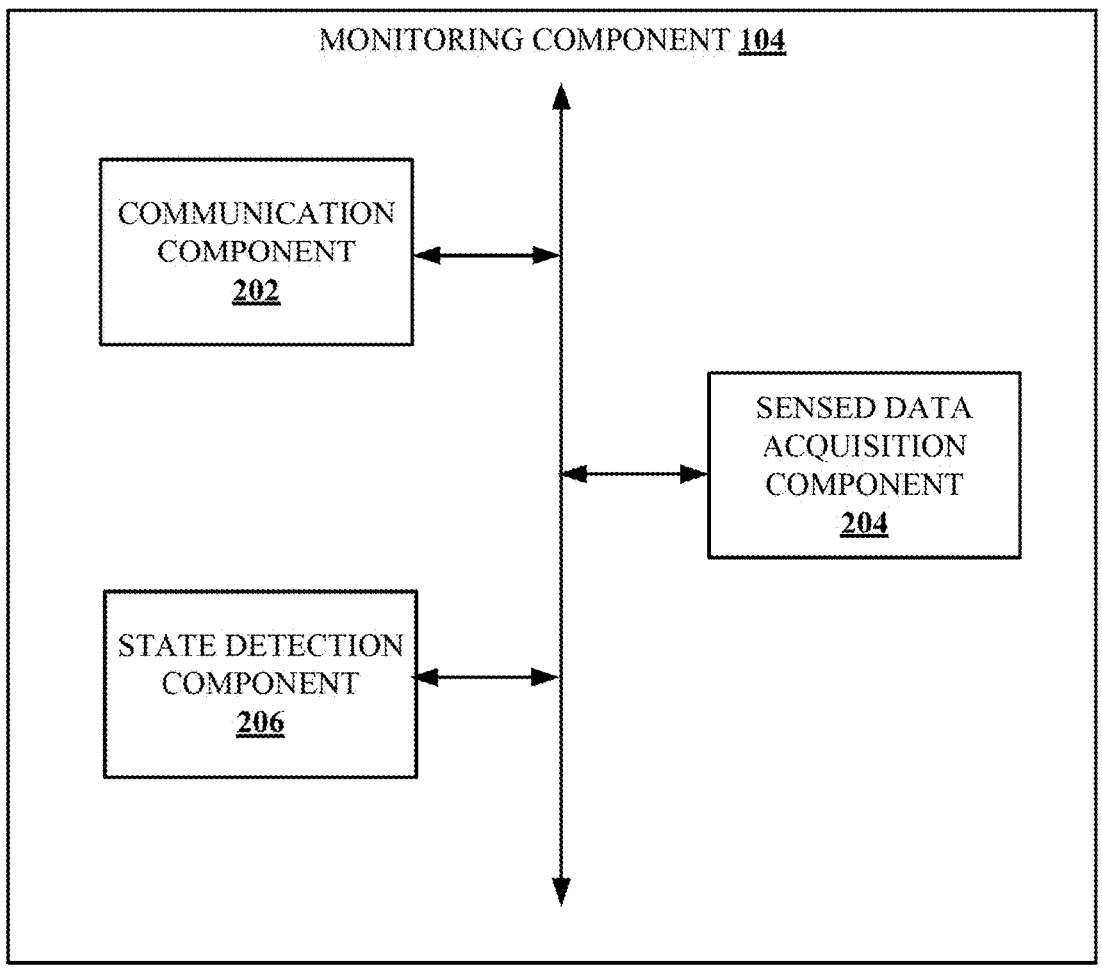
FIG. 2 illustrates a block diagram of an example, non-limiting monitoring component that facilitates networked smart sensor devices monitoring physical components of an aircraft in accordance with one or more embodiments described herein.

FIG. 2 illustrates a block diagram of an example, monitoring component 104 that a primary function for sensing a state of a physical component and can concurrently enable one or more backup functions for sensing one or more states of one or more other physical components in response to one or more other smart sensor devices not being able to perform their primary function of sensing and/or reporting on the one or more states of the one or more other physical components in accordance with one or more embodiments described herein. Repetitive description of like elements employed in other embodiments described herein is omitted for sake of brevity.

In some embodiments, monitoring component 104 can include communication component 202 that can receive data from or transmit data to another smart sensor device 102, smart sensor device 116, and/or server device 118. In a non-limiting example, communication component 202 can transmit sensed information generated by state detection component 206 to another smart sensor device 102, smart sensor device 116, and/or server device 118. In another example, communication component 202 can receive sensed information from another smart sensor device 102 or smart sensor device 116. In a further example, communication component 202 can receive control instructions (e.g. commands or requests) from another smart sensor device 102, smart sensor device 116, and/or server device 118. It is to be appreciated that communication component 202 can receive any suitable type of data from or transmit any suitable type of data to another smart sensor device 102, smart sensor device 116, and/or server device 118. It is to be appreciated that communication component 202 can send sensed information periodically or on-demand to another smart sensor device 102, smart sensor device 116, and/or server device 118.

Monitoring component 104 can also include sensed data acquisition component 204 that can obtain continuously, periodically, or on-demand signals and/or data from sensing element 106. In a non-limiting example, sensed data acquisition component 204 can continuously gather signals and/or data from sensing element 106. In another non-limiting example, sensed data acquisition component 204 can gather signals and/or data from sensing element 106 at regular or irregular intervals. In a further non-limiting example, sensed data acquisition component 204 can gather signals and/or data from sensing element 106 in response to receipt of a control instruction such as from communication component 202 or state detection component 206.

Monitoring component 104 can include state detection component 206 that can determine sensed information based on signals and/or data gathered by sensed data acquisition component 204 that can indicate a state of a physical component being monitored by smart sensor device 102. Furthermore, state detection component 206 can determine sensed information based upon one or more self-check components (not shown) that indicate a health state (e.g. operating properly or a fault condition) of smart sensor device 102. For example, the health state can indicate whether smart sensor device 102 can reliably perform primary and/or backup sensing functions, or associated reporting of sensed information to another smart sensor device 102, smart sensor device 116, and/or server device 118.

State detection component 206 can also include a primary sensing function for generating sensed information associated with a primary physical component that smart sensor device 102 is primarily responsible for monitoring. State detection component 206 can also include one or more backup sensing functions for generating sensed information associated with one or more other physical components that smart sensor device 102 has a backup responsibility for monitoring.

Figure 3:
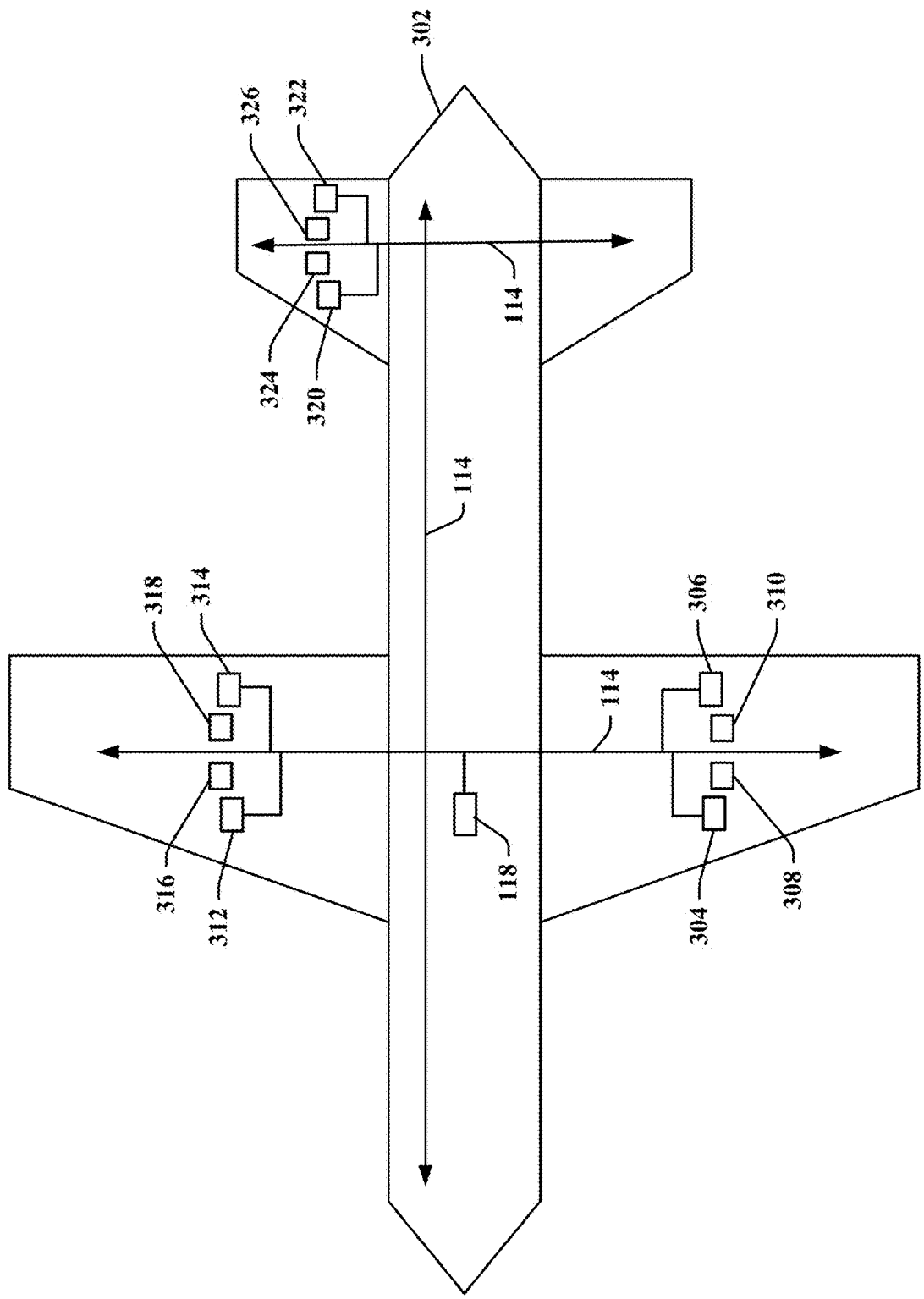
FIG. 3 illustrates a block diagram of a non-limiting example of networked smart sensor devices monitoring physical components of an aircraft in accordance with one or more embodiments described herein.

FIG. 3 illustrates a block diagram of an example, non-limiting aircraft 302 with network smart sensor devices (e.g. smart sensor device 102 and/or smart sensor device 116) monitoring components of aircraft 302. Aircraft can comprise one or more networks 114 that communicatively couple one or more server devices 118 and smart sensor devices 304, 306, 312, 314, 320, and 322. It is to be appreciated that respective smart sensor devices 304, 306, 312, 314, 320, and 322 can be a smart sensor device 102 or a smart sensor device 116. Smart sensor devices 304, 306, 312, 314, 320, and 322 can operate in pairs to provide primary and backup sensing of physical components 308, 310, 316, 318, 324, and 326. For example, smart sensor device 304 can be a primary sensor for physical component 308 and a backup sensor for physical component 310, while smart sensor device 306 can be a primary sensor for physical component 310 and a backup sensor for physical component 308. Similarly, smart sensor device 312 can be a primary sensor for physical component 316 and a backup sensor for physical component 318, while smart sensor device 314 can be a primary sensor for physical component 318 and a backup sensor for physical component 316. Similarly, smart sensor device 320 can be a primary sensor for physical component 324 and a backup sensor for physical component 326, while smart sensor device 322 can be a primary sensor for physical component 326 and a backup sensor for physical component 324. It is to be appreciated that aircraft 302 more or less quantities of pairs of smart sensor devices providing primary and backup sensing of more or less physical components of aircraft 302. While FIG. 3 depicts pairs of smart sensor devices performing as backup for each other, it is to be appreciated that aircraft 302 can include one or more sets respectively comprising three or more smart sensor devices that can as backups for each other while also performing their primary sensing functions on physical components of aircraft 302.

Figure 4:
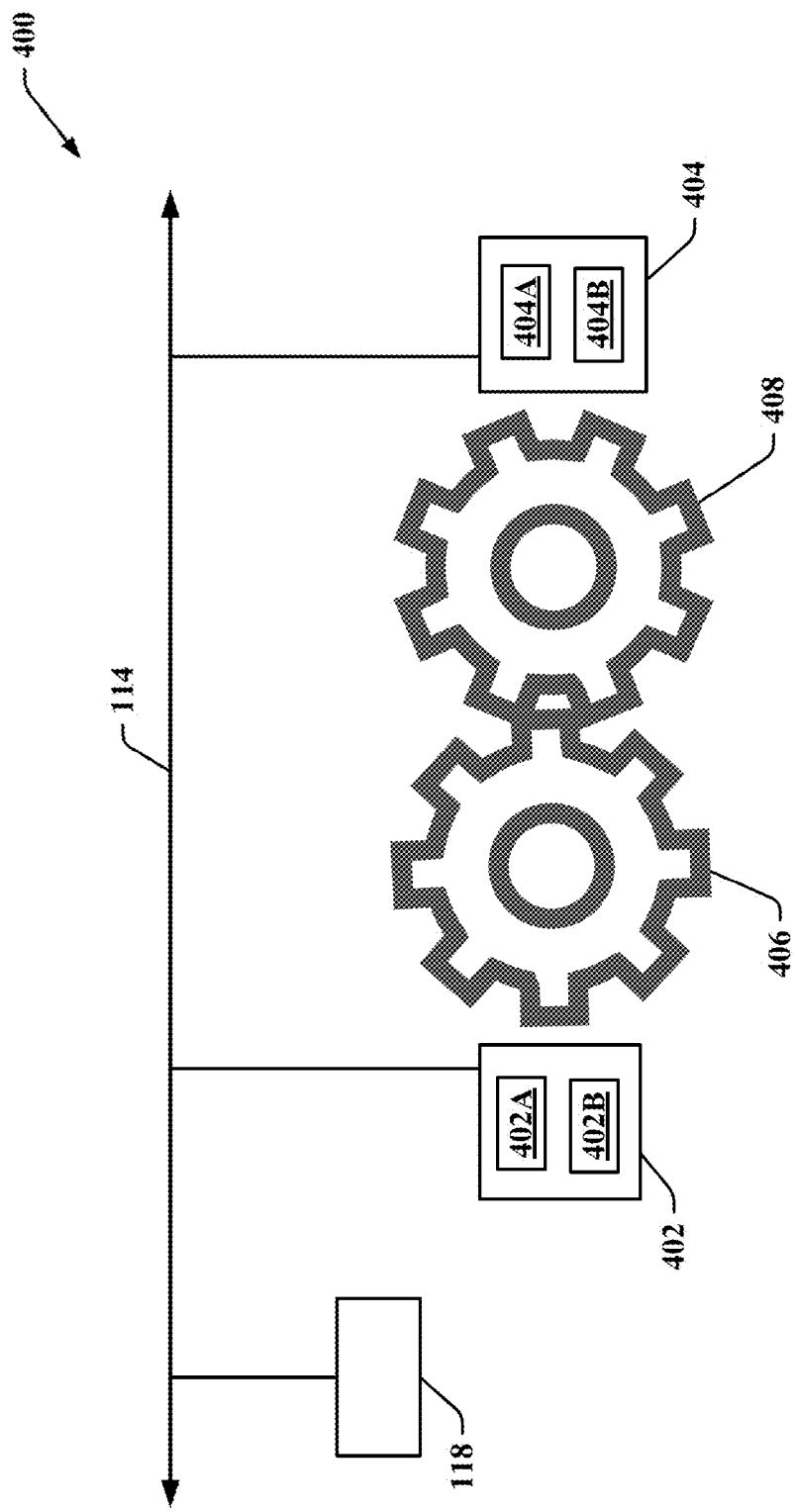
FIG. 4 illustrates a block diagram of a non-limiting example of networked smart sensor devices monitoring physical components of an aircraft in accordance with one or more embodiments described herein.

FIG. 4 illustrates a block diagram of an example, non-limiting system 400 of network smart sensor devices monitoring components of an aircraft. System 400 can comprise one or more networks 114 that communicatively couple one or more server devices 118 and smart sensor devices 402 and 404. It is to be appreciated that respective smart sensor devices 402 and 404 can be a smart sensor device 102 or a smart sensor device 116. For illustrative purposes only, in this non-limiting example smart sensor devices 402 and 404 are both smart sensor devices 102. Smart sensor device 402 can be a primary sensor for physical component 406 and a backup sensor for physical component 408. Accordingly, smart sensor device 402 can include a primary sensing function 402A for determining sensing information associated with physical component 406, and a backup sensing function 402B for determining sensing information associated with physical component 408. Smart sensor device 404 can include a primary sensing function 404A for determining sensing information associated with physical component 408, and a backup sensing function 404B for determining sensing information associated with physical component 406.

In an embodiment, primary sensing function 402A can be the same as backup sensing function 404B, and/or primary sensing function 404A can be the same as backup sensing function 402B. In another embodiment, primary sensing function 402A can be different than backup sensing function 404B, and/or primary sensing function 404A can be different than backup sensing function 402B. For example, primary sensing function 402A can be customized to account for characteristics of smart sensor device 402, while backup sensing function 404B can be customized to account for characteristics of smart sensor device 404. Non-limiting examples of characteristics of smart sensor device can include, model, sensing element type, sensing capabilities, location, position, sensing reliability, sensing accuracy, maintenance history, or any other suitable characteristics of a smart sensor device. For example, primary sensing function 402A can be customized based on the location of smart sensor device 402 relative to physical component 406, and backup sensing function 404B can be customized based on the location of smart sensor device 404 relative to physical component 406. For example, the respective sensing functions can adjust sensed information based on a distance of the sensing element from the physical component. In another example, the respective sensing functions can adjust sensed information based on a direction the sensing element is facing relative to the physical component. It is to be appreciated that a sensing function can adjust sensed information based upon any suitable characteristic of an associated smart sensor device.

Smart sensor device 402 can generate sensed information related to physical component 406 using primary sensing function 402A and/or related to the health state of smart sensor device 402, and smart sensor device 404 can generate sensed information related to physical component 408 using primary sensing function 404A and/or related to the health state of smart sensor device 404. Smart sensor device 402 can also monitor communications from smart sensor device 404 to determine if smart sensor device 404 can reliably provide sensed information, and smart sensor device 404 can also monitor communications from smart sensor device 402 to determine if smart sensor device 402 can reliably provide sensed information.

If smart sensor device 402 determines that smart sensor device 404 is no longer communicating or that smart sensor device 404 has communicated sensed information indicating that smart sensor device 404 is not able to operate reliably, then smart sensor device 402 enable backup sensing function 402B to generate sensed information related to physical component 408 in addition to the already enabled primary sensing function 402A generating sensed information related to physical component 406 and communicate the respective sensed information, for example to server device 118.

If smart sensor device 404 determines that smart sensor device 402 is no longer communicating or that smart sensor device 402 has communicated sensed information indicating that smart sensor device 402 is not able to operate reliably, then smart sensor device 404 enable backup sensing function 404B to generate sensed information related to physical component 406 in addition to the already enabled primary sensing function 404A generating sensed information related to physical component 408 and communicate the respective sensed information, for example to server device 118.

Figure 5:
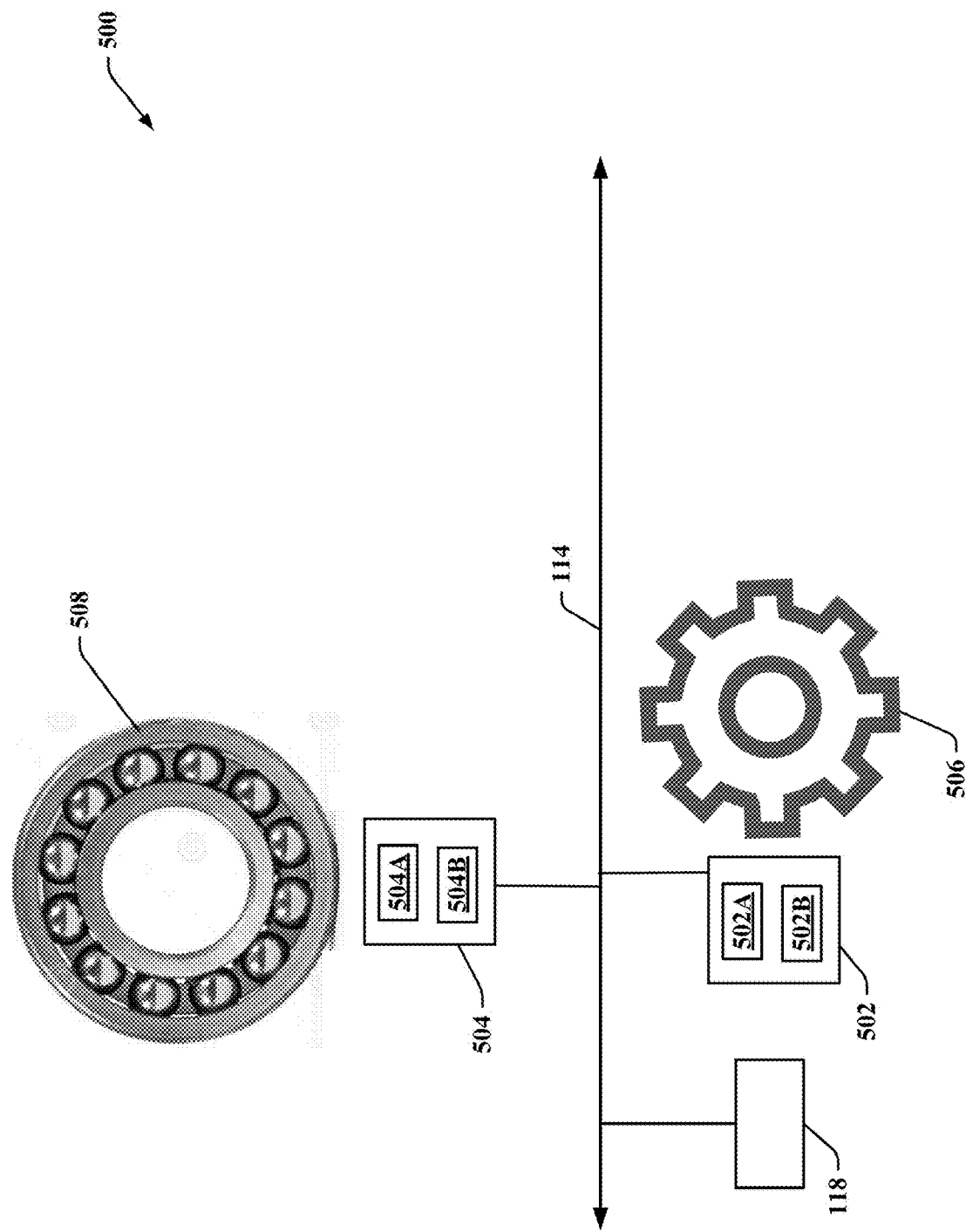
FIG. 5 illustrates a block diagram of a non-limiting example of networked smart sensor devices monitoring physical components of an aircraft in accordance with one or more embodiments described herein.

FIG. 5 illustrates a block diagram of an example, non-limiting system 500 of network smart sensor devices monitoring components of an aircraft. System 500 can comprise one or more networks 114 that communicatively couple one or more server devices 118 and smart sensor devices 502 and 504. It is to be appreciated that respective smart sensor devices 502 and 504 can be a smart sensor device 102 or a smart sensor device 116. For illustrative purposes only, in this non-limiting example smart sensor device 502 can be similar to smart sensor device 102, and smart sensor device 504 can be similar to smart sensor device 116. As discussed above, smart sensor device 116 has more, less, or different sensing capabilities than smart sensor device 102. For example, smart sensor device 502 can be a vibration sensor device, while smart sensor device 504 can be an acoustic sensor device. Smart sensor device 502 can be a primary sensor for physical component 506 and a backup sensor for physical component 508. Accordingly, smart sensor device 502 can include a primary sensing function 502A for determining sensing information associated with physical component 506, and a backup sensing function 502B for determining sensing information associated with physical component 508. Smart sensor device 504 can include a primary sensing function 504A for determining sensing information associated with physical component 508, and a backup sensing function 504B for determining sensing information associated with physical component 506.

In an embodiment, primary sensing function 502A can be different than backup sensing function 504B, and/or primary sensing function 504A can be different than backup sensing function 502B. For example, primary sensing function 502A can be customized to account for vibration sensing, as well as other characteristics of smart sensor device 502, while backup sensing function 404B can be customized to account for acoustic sensing, as well as other characteristics of smart sensor device 504.

Smart sensor device 502 can generate sensed information related to physical component 506 using primary sensing function 502A and/or related to the health state of smart sensor device 502, and smart sensor device 504 can generate sensed information related to physical component 508 using primary sensing function 504A and/or related to the health state of smart sensor device 504. Smart sensor device 502 can also monitor communications from smart sensor device 504 to determine if smart sensor device 504 can reliably provide sensed information, and smart sensor device 504 can also monitor communications from smart sensor device 502 to determine if smart sensor device 402 can reliably provide sensed information.

If smart sensor device 502 determines that smart sensor device 504 is no longer communicating or that smart sensor device 504 has communicated sensed information indicating that smart sensor device 504 is not able to operate reliably, then smart sensor device 502 enable backup sensing function 502B to generate sensed information related to physical component 508 in addition to the already enabled primary sensing function 502A generating sensed information related to physical component 506 and communicate the respective sensed information, for example to server device 118.

If smart sensor device 504 determines that smart sensor device 502 is no longer communicating or that smart sensor device 502 has communicated sensed information indicating that smart sensor device 502 is not able to operate reliably, then smart sensor device 504 enable backup sensing function 504B to generate sensed information related to physical component 506 in addition to the already enabled primary sensing function 504A generating sensed information related to physical component 508 and communicate the respective sensed information, for example to server device 118.

Figure 6:
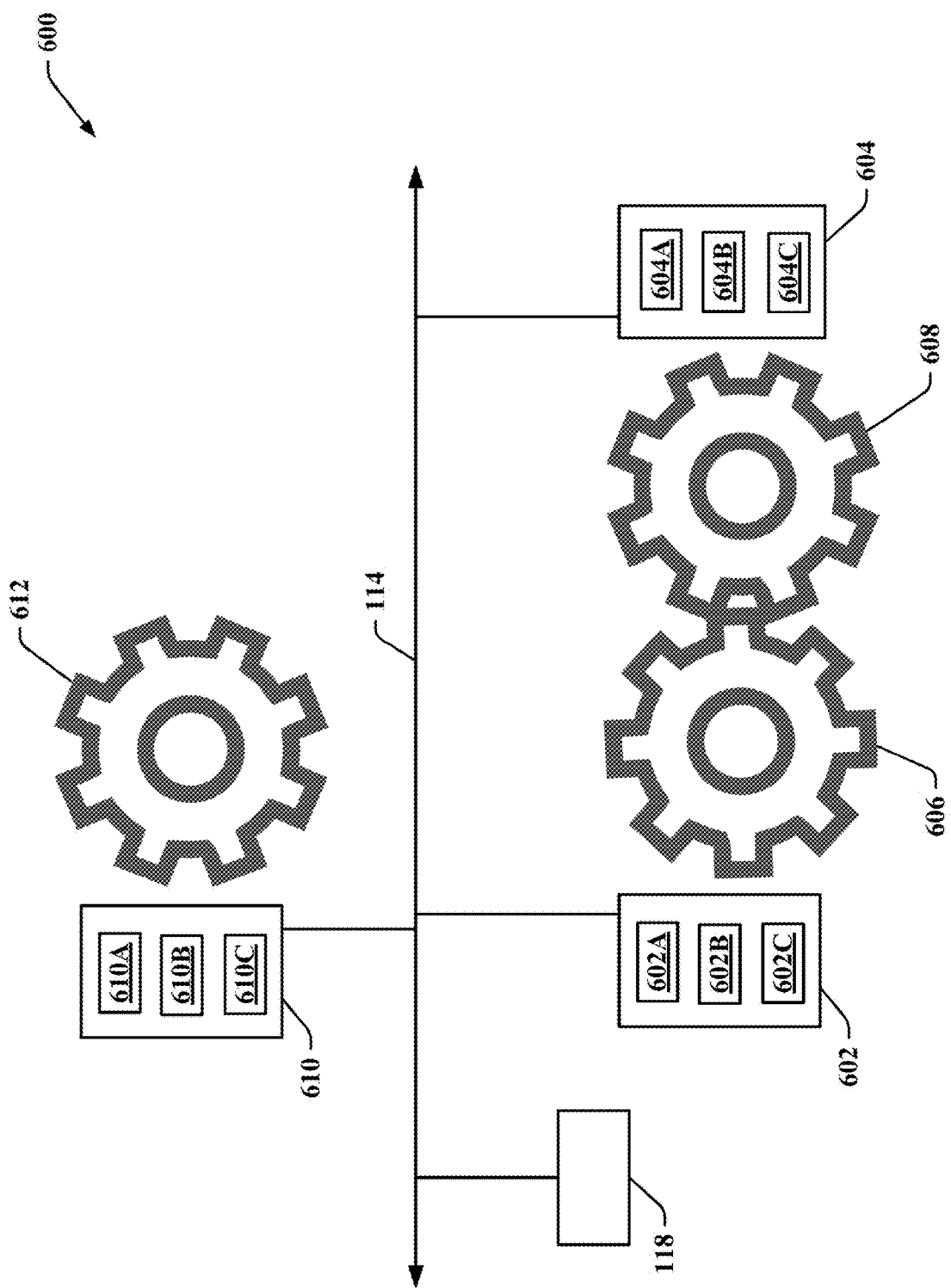
FIG. 6 illustrates a block diagram of a non-limiting example of networked smart sensor devices monitoring physical components of an aircraft in accordance with one or more embodiments described herein.

FIG. 6 illustrates a block diagram of an example, non-limiting system 600 of network smart sensor devices monitoring components of an aircraft. System 600 can comprise one or more networks 114 that communicatively couple one or more server devices 118 and smart sensor devices 602, 604, and 610. It is to be appreciated that respective smart sensor devices 602, 604, and 610 can be a smart sensor device 102 or a smart sensor device 116. Smart sensor device 502 can be a primary sensor for physical component 606 and a backup sensor for physical components 608 and 612. Accordingly, smart sensor device 602 can include a primary sensing function 602A for determining sensing information associated with physical component 606, backup sensing function 602B for determining sensing information associated with physical component 608, and backup sensing function 602C for determining sensing information associated with physical component 612. Smart sensor device 604 can include a primary sensing function 604A for determining sensing information associated with physical component 608, backup sensing function 604B for determining sensing information associated with physical component 606. and a backup sensing function 604C for determining sensing information associated with physical component 612. Smart sensor device 610 can include a primary sensing function 610A for determining sensing information associated with physical component 612, backup sensing function 610B for determining sensing information associated with physical component 606. and a backup sensing function 610C for determining sensing information associated with physical component 608.

Smart sensor device 602 can generate sensed information related to physical component 606 using primary sensing function 602A and/or related to the health state of smart sensor device 602. Smart sensor device 604 can generate sensed information related to physical component 608 using primary sensing function 604A and/or related to the health state of smart sensor device 604. Smart sensor device 610 can generate sensed information related to physical component 612 using primary sensing function 610A and/or related to the health state of smart sensor device 610. Smart sensor device 602 can also monitor communications from smart sensor device 604 to determine if smart sensor device 604 can reliably provide sensed information, and can also monitor communications from smart sensor device 610 to determine if smart sensor device 610 can reliably provide sensed information. Smart sensor device 604 can also monitor communications from smart sensor device 602 to determine if smart sensor device 602 can reliably provide sensed information, and can also monitor communications from smart sensor device 610 to determine if smart sensor device 610 can reliably provide sensed information. Smart sensor device 610 can also monitor communications from smart sensor device 602 to determine if smart sensor device 602 can reliably provide sensed information, and can also monitor communications from smart sensor device 604 to determine if smart sensor device 604 can reliably provide sensed information If smart sensor device 602 determines that smart sensor device 604 is no longer communicating or that smart sensor device 604 has communicated sensed information indicating that smart sensor device 604 is not able to operate reliably, then smart sensor device 602 enable backup sensing function 602B to generate sensed information related to physical component 608 in addition to the already enabled primary sensing function 602A (and optionally backup sensing function 602C if smart sensor device 610 is not operating properly) generating sensed information related to physical component 606 (and optionally physical component 612 if smart sensor device 610 is not operating properly) and communicate the respective sensed information, for example to server device 118. Furthermore, if smart sensor device 602 determines that smart sensor device 610 is no longer communicating or that smart sensor device 610 has communicated sensed information indicating that smart sensor device 610 is not able to operate reliably, then smart sensor device 602 enable backup sensing function 602C to generate sensed information related to physical component 612 in addition to the already enabled primary sensing function 602A (and optionally backup sensing function 602B if smart sensor device 604 is not operating properly) generating sensed information related to physical component 606 (and optionally physical component 608 if smart sensor device 604 is not operating properly) and communicate the respective sensed information, for example to server device 118

If smart sensor device 604 determines that smart sensor device 602 is no longer communicating or that smart sensor device 602 has communicated sensed information indicating that smart sensor device 602 is not able to operate reliably, then smart sensor device 604 enable backup sensing function 604B to generate sensed information related to physical component 606 in addition to the already enabled primary sensing function 604A (and optionally backup sensing function 604C if smart sensor device 610 is not operating properly) generating sensed information related to physical component 608 (and optionally physical component 612 if smart sensor device 610 is not operating properly) and communicate the respective sensed information, for example to server device 118. Furthermore, if smart sensor device 604 determines that smart sensor device 610 is no longer communicating or that smart sensor device 610 has communicated sensed information indicating that smart sensor device 610 is not able to operate reliably, then smart sensor device 604 enable backup sensing function 604C to generate sensed information related to physical component 612 in addition to the already enabled primary sensing function 604A (and optionally backup sensing function 604B if smart sensor device 602 is not operating properly) generating sensed information related to physical component 608 (and optionally physical component 606 if smart sensor device 602 is not operating properly) and communicate the respective sensed information, for example to server device 118

If smart sensor device 610 determines that smart sensor device 602 is no longer communicating or that smart sensor device 602 has communicated sensed information indicating that smart sensor device 602 is not able to operate reliably, then smart sensor device 610 enable backup sensing function 610B to generate sensed information related to physical component 606 in addition to the already enabled primary sensing function 610A (and optionally backup sensing function 610C if smart sensor device 604 is not operating properly) generating sensed information related to physical component 612 (and optionally physical component 608 if smart sensor device 604 is not operating properly) and communicate the respective sensed information, for example to server device 118. Furthermore, if smart sensor device 610 determines that smart sensor device 608 is no longer communicating or that smart sensor device 608 has communicated sensed information indicating that smart sensor device 608 is not able to operate reliably, then smart sensor device 610 enable backup sensing function 610C to generate sensed information related to physical component 608 in addition to the already enabled primary sensing function 610A (and optionally backup sensing function 610B if smart sensor device 602 is not operating properly) generating sensed information related to physical component 612 (and optionally physical component 606 if smart sensor device 602 is not operating properly) and communicate the respective sensed information, for example to server device 118

While FIGS. 1 and 2 depict separate components in smart sensor device 102, it is to be appreciated that two or more components can be implemented in a common component. Further, it is to be appreciated that the design of the smart sensor device 102 or smart sensor device 116 can include other component selections and/or component placements to facilitate performing primary and backup sensing functions. Moreover, the aforementioned systems and/or devices have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

Further, some of the processes performed may be performed by specialized computers for carrying out defined tasks related to primary and backup sensing functions of smart sensor devices 102 and/or smart sensor devices 116. The subject computer processing systems, methods apparatuses and/or computer program products can be employed to solve new problems that arise through advancements in technology, computer networks, the Internet and the like.

The subject computer processing systems, methods apparatuses and/or computer program products can provide technical improvements to systems for primary and backup sensing functions of smart sensor devices 102 and/or smart sensor devices 116 by improving processing efficiency among processing components in these systems, reducing delay in processing performed by the processing components, and improving the accuracy in which the processing systems perform primary and backup sensing functions of smart sensor devices 102 and/or smart sensor devices 116.

The embodiments of devices described herein can employ artificial intelligence (AI) to facilitate automating one or more features described herein. The components can employ various AI-based schemes for carrying out various embodiments/examples disclosed herein. In order to provide for or aid in the numerous determinations (e.g., determine, ascertain, infer, calculate, predict, prognose, estimate, derive, forecast, detect) described herein, components described herein can examine the entirety or a subset of the data to which it is granted access and can provide for reasoning about or determine states of the system, environment, etc. from a set of observations as captured via events and/or data. Determinations can be employed to identify a specific context or action, and/or can generate a probability distribution over states, for example. The determinations can be probabilistic—that is, the computation of a probability distribution over states of interest based on a consideration of data and events. Determinations can also refer to techniques employed for composing higher-level events from a set of events and/or data.

Such determinations can result in the construction of new events or actions from a set of observed events and/or stored event data, whether or not the events are correlated in close temporal proximity, and whether the events and data come from one or several event and data sources. Components disclosed herein can employ various classification (explicitly trained (e.g., via training data) as well as implicitly trained (e.g., via observing behavior, preferences, historical information, receiving extrinsic information, etc.)) schemes and/or systems (e.g., support vector machines, neural networks, expert systems, Bayesian belief networks, fuzzy logic, data fusion engines, etc.) in connection with performing automatic and/or determined action in connection with the claimed subject matter. Thus, classification schemes and/or systems can be used to automatically learn and perform a number of functions, actions, and/or determination.

A classifier can map an input attribute vector, $z=(z1, z2, z3, z4, zn)$, to a confidence that the input belongs to a class, as by $f(z)=confidence(class)$. Such classification can employ a probabilistic and/or statistical-based analysis (e.g., factoring into the analysis utilities and costs) to determinate an action to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
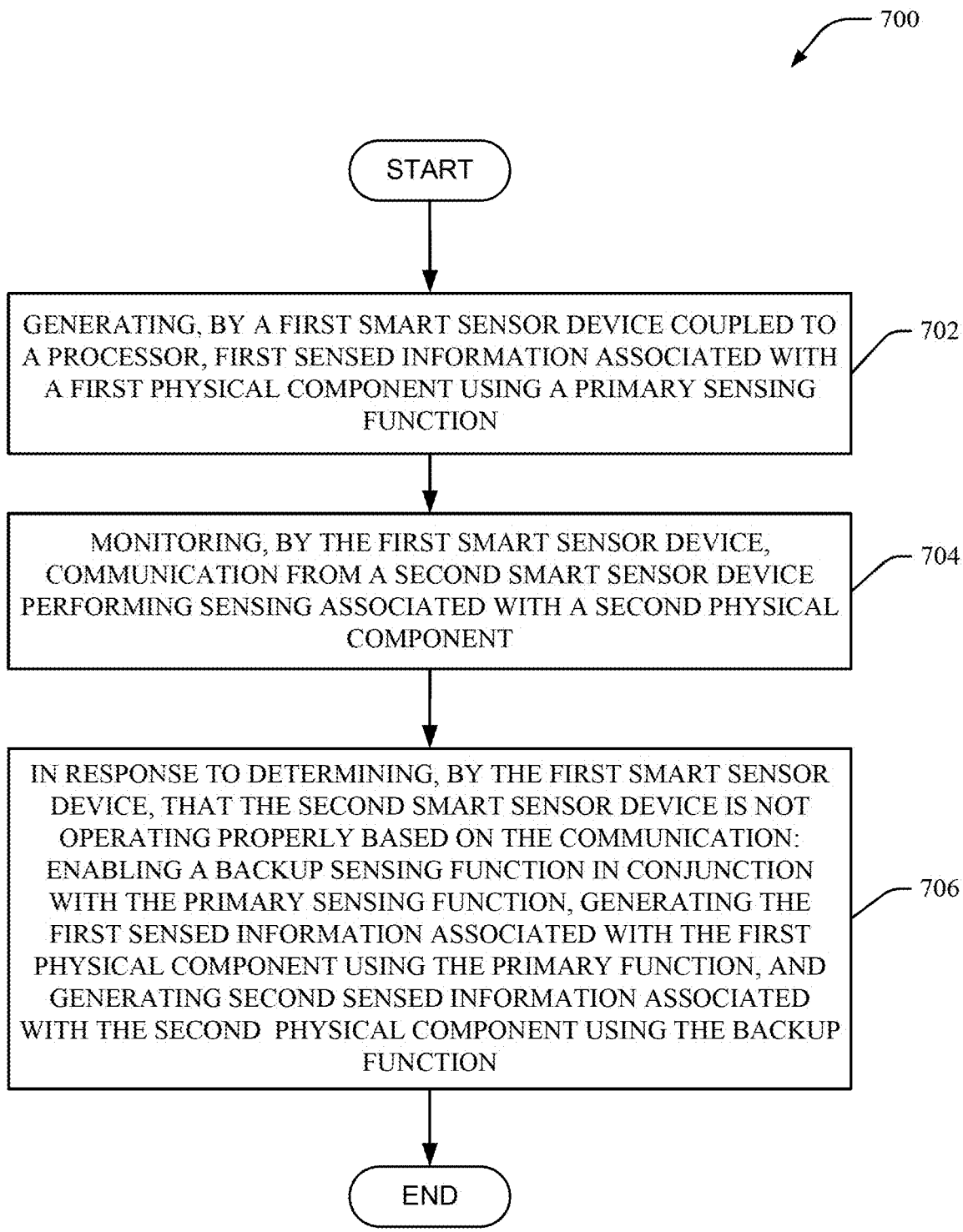
FIG. 7 illustrates a flow diagram of an example, non-limiting computer-implemented method that facilitates primary and backup sensing functions of smart sensor devices of an aircraft in accordance with one or more embodiments described herein.
Figure 8:
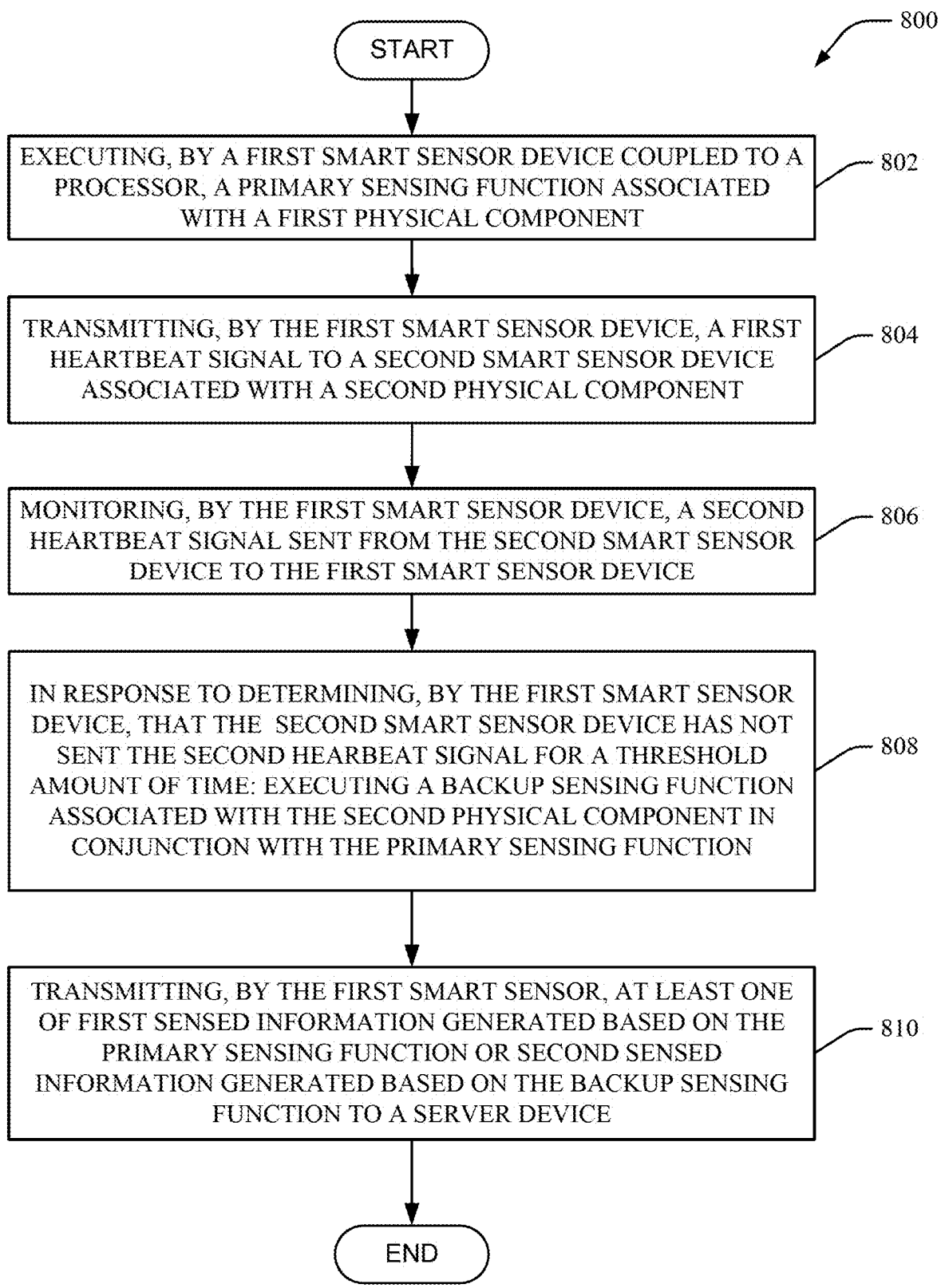
FIG. 8 illustrates a flow diagram of an example, non-limiting computer-implemented method that facilitates primary and backup sensing functions of smart sensor devices of an aircraft in accordance with one or more embodiments described herein.

FIGS. 7 and 8 illustrate methodologies in accordance with one or more embodiments of the subject application. While, for purposes of simplicity of explanation, the methodologies shown herein is shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 7 illustrates a flow diagram of an example, non-limiting computer-implemented method 700 that facilitates primary and backup sensing functions of smart sensor devices of an aircraft in accordance with one or more embodiments described herein. Repetitive description of like elements employed in other embodiments described herein is omitted for sake of brevity.

At 702, method 700 can comprise generating, by a first smart sensor device coupled to a processor, first sensed information associated with a first physical component using a primary sensing function (e.g., via a sensed data acquisition component 204, a state detection component 206, a monitoring component 104, a smart sensor device 102, and/or a smart sensor device 116). At 704, method 700 can comprise monitoring, by the first smart sensor device, communication from a second smart sensor device performing sensing associated with a second physical component (e.g., via a communication component 202, a state detection component 206, a monitoring component 104, a smart sensor device 102, and/or a smart sensor device 116). At 706, method 700 can comprise in response to determining, by the first smart sensor device, that the second smart sensor device is not operating properly based on the communication: enabling a backup sensing function in conjunction with the primary sensing function, generating the first sensed information associated with the first physical component using the primary function, and generating second sensed information associated with the second physical component using the backup function (e.g., via a sensed data acquisition component 204, a state detection component 206, a monitoring component 104, a smart sensor device 102, and/or a smart sensor device 116)

FIG. 8 illustrates a flow diagram of an example, non-limiting computer-implemented method 800 that facilitates primary and backup sensing functions of smart sensor devices of an aircraft in accordance with one or more embodiments described herein. Repetitive description of like elements employed in other embodiments described herein is omitted for sake of brevity.

At 802, method 800 can comprise executing, by a first smart sensor device coupled to a processor, a primary sensing function associated with a first physical component (e.g., via a sensed data acquisition component 204, a communication component 202, a state detection component 206, a monitoring component 104, a smart sensor device 102, and/or a smart sensor device 116). At 804, method 800 can comprise transmitting, by the first smart sensor device, a first heartbeat signal to a second smart sensor device associated with a second physical component (e.g., via a sensed data acquisition component 204, a communication component 202, a state detection component 206, a monitoring component 104, a smart sensor device 102, and/or a smart sensor device 116). At 806, method 800 can comprise monitoring, by the first smart sensor device, a second heartbeat signal sent from the second smart sensor device to the first smart sensor device (e.g., via a sensed data acquisition component 204, a communication component 202, a state detection component 206, a monitoring component 104, a smart sensor device 102, and/or a smart sensor device 116). At 808, method 800 can comprise in response to determining, by the first smart sensor device, that the second smart sensor device has not sent the second heartbeat signal for a threshold amount of time: executing a backup sensing function associated with the second physical component in conjunction with the primary sensing function (e.g., via a sensed data acquisition component 204, a communication component 202, a state detection component 206, a monitoring component 104, a smart sensor device 102, and/or a smart sensor device 116). At 810, method 800 can comprise in response to transmitting, by the first smart sensor, at least one of first sensed information generated based on the primary sensing function or second sensed information generated based on the backup sensing function to a server device (e.g., via a sensed data acquisition component 204, a communication component 202, a state detection component 206, a monitoring component 104, a smart sensor device 102, and/or a smart sensor device 116).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 9:
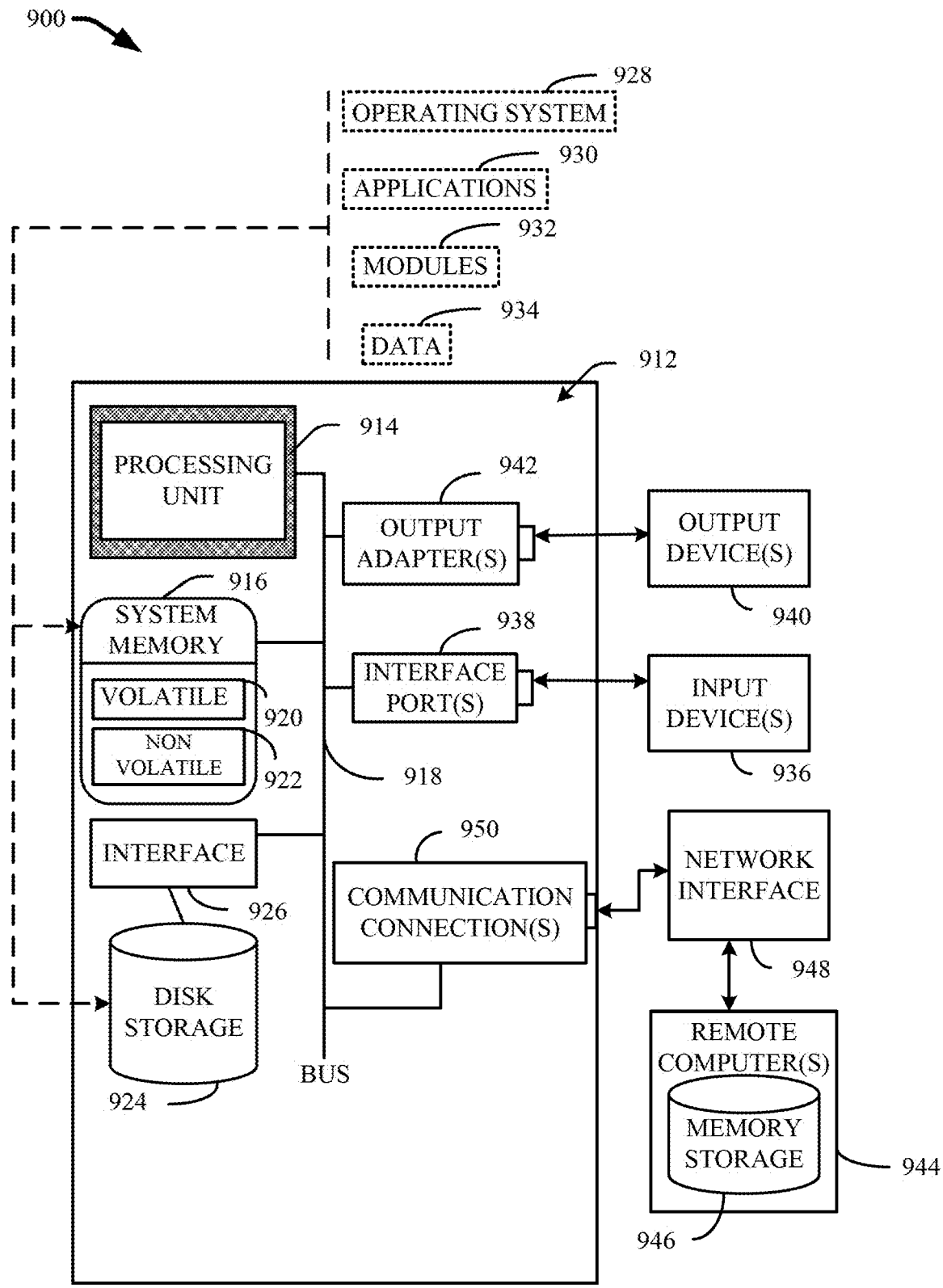
FIG. 9 illustrates a block diagram of an example, non-limiting operating environment in which one or more embodiments described herein can be facilitated.

In order to provide a context for the various aspects of the disclosed subject matter, FIG. 9 as well as the following discussion are intended to provide a general description of a suitable environment in which the various aspects of the disclosed subject matter can be implemented. FIG. 9 illustrates a block diagram of an example, non-limiting operating environment in which one or more embodiments described herein can be facilitated. Repetitive description of like elements employed in other embodiments described herein is omitted for sake of brevity. With reference to FIG. 9, a suitable operating environment 900 for implementing various aspects of this disclosure can also include a computer 912. The computer 912 can also include a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914. The system bus 918 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1294), and Small Computer Systems Interface (SCSI). The system memory 916 can also include volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 920 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 912 can also include removable/non-removable, volatile/non-volatile computer storage media. FIG. 9 illustrates, for example, a disk storage 924. Disk storage 924 can also include, but is not limited to, devices like a magnetic disk drive, floppy disk drive, tape drive, Jaz drive, Zip drive, LS-100 drive, flash memory card, or memory stick. The disk storage 924 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 924 to the system bus 918, a removable or non-removable interface is typically used, such as interface 926. FIG. 9 also depicts software that acts as an intermediary between users and the basic computer resources described in the suitable operating environment 901. Such software can also include, for example, an operating system 928. Operating system 928, which can be stored on disk storage 924, acts to control and allocate resources of the computer 912. System applications 930 take advantage of the management of resources by operating system 928 through program modules 932 and program data 934, e.g., stored either in system memory 916 or on disk storage 924. It is to be appreciated that this disclosure can be implemented with various operating systems or combinations of operating systems. A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port can be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a computer, a server, a router, a network PC, a workstation, a microprocessor based appliance, a peer device or other common network node and the like, and typically can also include many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 950 refers to the hardware/software employed to connect the network interface 948 to the system bus 918. While communication connection 950 is shown for illustrative clarity inside computer 912, it can also be external to computer 912. The hardware/software for connection to the network interface 948 can also include, for exemplary purposes only, internal and external technologies such as, modems including regular telephone grade modems, cable modems and DSL modems, ISDN adapters, and Ethernet cards.

Figure 10:
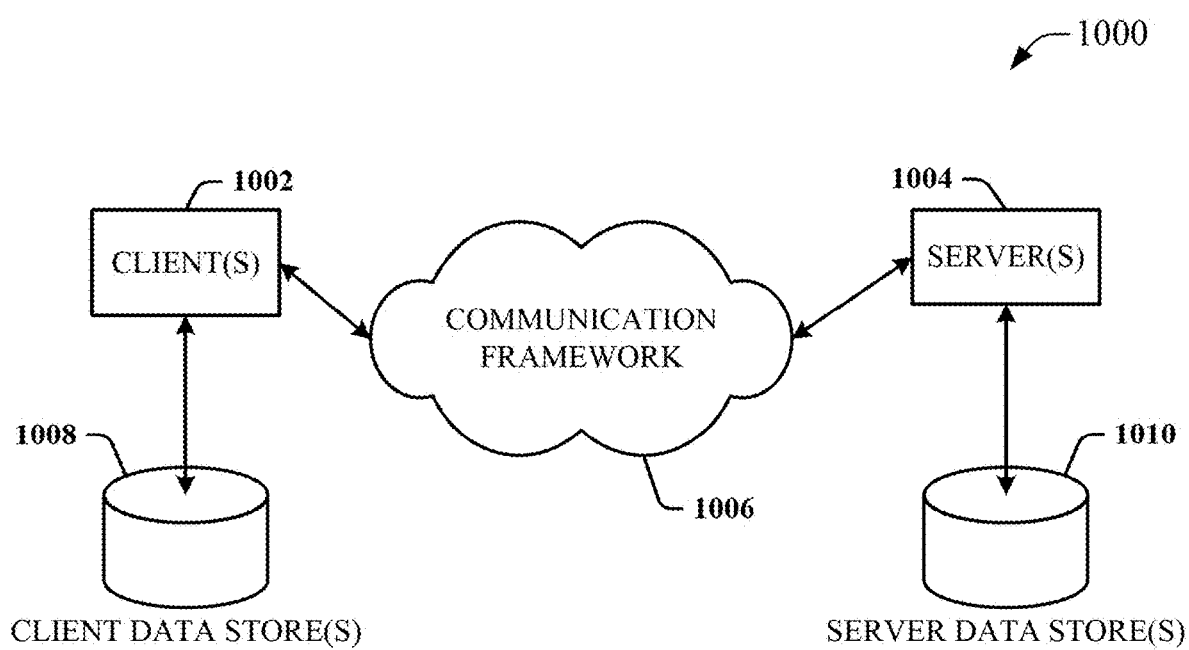
FIG. 10 illustrates a block diagram of an example, non-limiting computer environment in which one or more embodiments described herein can be facilitated.

FIG. 10 is a schematic block diagram of a sample computing environment 1000 with which the disclosed subject matter can interact. The sample computing environment 1000 includes one or more client(s) 1002. The client(s) 1002 can be hardware and/or software (e.g., threads, processes, computing devices). The sample computing environment 1000 also includes one or more server(s) 1004. The server(s) 1004 can also be hardware and/or software (e.g., threads, processes, computing devices). The servers 1004 can house threads to perform transformations by employing one or more embodiments as described herein, for example. One possible communication between a client 1002 and servers 1004 can be in the form of a data packet adapted to be transmitted between two or more computer processes. The sample computing environment 1000 includes a communication framework 1006 that can be employed to facilitate communications between the client(s) 1002 and the server(s) 1004. The client(s) 1002 are operably connected to one or more client data store(s) 1008 that can be employed to store information local to the client(s) 1002. Similarly, the server(s) 1004 are operably connected to one or more server data store(s) 1010 that can be employed to store information local to the servers 1004.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

Furthermore, the term "set" as employed herein excludes the empty set; e.g., the set with no elements therein, unless expressly indicated otherwise. Thus, a "set" in the subject disclosure includes one or more elements or entities. As an illustration, a set of devices includes one or more devices; a set of data resources includes one or more data resources, unless expressly indicated otherwise; etc. Likewise, the term "group" as utilized herein refers to a collection of one or more entities; e.g., a group of nodes refers to one or more nodes.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What we claim is:

1. A first smart sensor device, comprising:
   a sensing element;
   a processor; and
   a memory communicatively coupled to the processor, the memory having stored therein computer-executable instructions, wherein the computer-executable instructions comprise:
      generating first sensed information associated with a first aircraft physical hardware component based on execution of a primary sensing function and one or more signals from the sensing element;
      monitoring communication from a second smart sensor device that performs sensing associated with a second aircraft physical hardware component, wherein the first aircraft physical hardware component and the second aircraft physical hardware component are different hardware components; and
      based on a first determination that the second smart sensor device is not operating properly based on the communication from the second smart sensor device:
         enabling a backup sensing function at the first smart sensor device, wherein the backup sensing function is a same sensing function performed by the second smart sensor device,
         continuing to generate the first sensed information associated with the first aircraft physical hardware component using the primary sensing function and the one or more signals from the sensing element, and
         generating second sensed information associated with the second aircraft physical hardware component using the backup sensing function and one or more other signals from the sensing element,
      wherein the generating of the first sensed information associated with the first aircraft physical hardware component and the generating of the second sensed information associated with the second aircraft physical hardware component are performed concurrently.

2. The first smart sensor device of claim 1, wherein the computer-executable instructions further comprise concurrently transmitting the first sensed information and the second sensed to a server device.

3. The first smart sensor device of claim 1, wherein the computer-executable instructions further comprise:
   receiving a heartbeat signal from the second smart sensor device; and
   performing the first determination that the second smart sensor device is not operating properly based on a second determination that the heartbeat signal has not been received for a threshold amount of time.

4. The first smart sensor device of claim 1, wherein the computer-executable instructions further comprise determining that the second smart sensor device is not operating properly based on a health status message received from the second smart sensor device.

5. The first smart sensor device of claim 1, wherein the backup sensing function is different than the primary sensing function.

6. The first smart sensor device of claim 5, wherein the computer-executable instructions further comprise customizing the primary sensing function based upon a distance between the first smart sensor device and the first aircraft physical hardware component.

7. The first smart sensor device of claim 5, wherein the computer-executable instructions further comprise customizing the backup sensing function based upon a distance between the first smart sensor device and the second aircraft physical hardware component.

8. A method, comprising:
   generating, by a first smart sensor device, first sensed information associated with a first aircraft hardware component based on execution of a primary sensing function;
   monitoring, by the first smart sensor device, status messages received from a second smart sensor device that is configured to perform sensing associated with a second aircraft hardware component, where the first aircraft hardware component and the second aircraft hardware component are different hardware components, and wherein the status messages comprise respective indications of a health state of the second smart sensor device; and
   based on determining, by the first smart sensor device, that the second smart sensor device is not operating properly based on the monitoring:
      enabling, by the first smart sensor device, a backup sensing function at a same time as, and in addition to, the primary sensing function, wherein the backup sensing function is a same sensing function as the sensing performed by the second smart sensor device, continuing to generate, by the first smart sensor device, the first sensed information associated with the first aircraft hardware component using the primary sensing function, and generating, by the first smart sensor device, second sensed information associated with the second aircraft hardware component using the backup sensing function, wherein the generating of the first sensed information associated with the first aircraft hardware component and the generating of the second sensed information associated with the second aircraft hardware component are performed at a same time.

9. The method of claim 8, further comprising concurrently transmitting, by the first smart sensor device, the first sensed information and the second sensed information to a server device.

10. The method of claim 8, wherein the monitoring the status messages comprises:

receiving a heartbeat signal from the second smart sensor device; and determining that the second smart sensor device is not operating properly based on determining that the heartbeat signal is not being received for a threshold amount of time.

11. The method of claim 8, wherein the monitoring the status messages comprises determining the second smart sensor device is not operating properly based on a health status message received from the second smart sensor device.

12. The method of claim 8, wherein the backup sensing function is different than the primary sensing function.

13. The method of claim 12, wherein the primary sensing function is customized based upon a direction in which the first smart sensor device is facing relative to the first aircraft hardware component.

14. The method of claim 12, wherein the backup sensing function is customized based upon a direction in which the second smart sensor device is facing relative to the second aircraft hardware component.

15. The method of claim 8, wherein the primary sensing function is customized based upon a distance between the first smart sensor device and the first aircraft hardware component.

16. The method of claim 8, wherein the backup sensing function is customized based upon a distance between the second smart sensor device and the second aircraft hardware component.

17. A system, comprising:

a first smart sensor device that monitors a first aircraft hardware component using a first function; and a second smart sensor device that monitors a second aircraft hardware component using a second function that is different from the first function, wherein the second smart sensor device is communicatively coupled to the first smart sensor device, wherein the first aircraft hardware component and the second aircraft hardware component are different hardware components, and wherein, based on a first determination that the second smart sensor device is no longer monitoring the second aircraft hardware component, the first smart sensor device is enabled to monitor the second aircraft hardware component using a third function, wherein the third function is a same function as the second function, and, simultaneously, continues to monitor the first aircraft hardware component using the first function while monitoring the second aircraft hardware component using the third function.

18. The system of claim 17, wherein the first smart sensor device performs the first determination that the second smart sensor device is no longer monitoring the second aircraft hardware component based on a second determination that a heartbeat signal has not been received from the second smart sensor device for a threshold amount of time.

19. The system of claim 17, wherein the first smart sensor device determines that the second smart sensor device is no longer monitoring the second aircraft hardware component based on a fault message received from the second smart sensor device.

20. The system of claim 17, wherein the second smart sensor device further comprises the first function for monitoring the first aircraft hardware component; and wherein, based on a second determination that the first smart sensor device is no longer monitoring the first aircraft hardware component, the second smart sensor device monitors the first aircraft hardware component using a fourth function, wherein the fourth function is a same function as the first function, and continues to monitor the second aircraft hardware component using the second function.

* * * * *